United States Patent Office  3,105,079
Patented Sept. 24, 1963

3,105,079
10-AMINOBENZOPYRIDOCOLINES
James R. Tretter, Niantic, Conn., assignor to Chas. Pfizer & Co., Inc., New York, N.Y., a corporation of Delaware
No Drawing. Filed Dec. 29, 1961, Ser. No. 163,084
10 Claims. (Cl. 260—287)

This invention relates to new and useful organic ring-nitrogen compounds as well as to their acid addition salts. More particularly, it is concerned with certain novel 2-hydroxybenzopyridocolines and derivatives thereof which have an amino group substituted on their aromatic A-ring.

The compounds which are included within the purview of this invention are selected from the group consisting of benzopyridocoline bases of the formula:

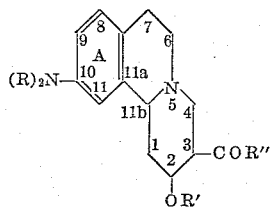

and the diacid addition salts thereof, wherein R is a member selected from the group consisting of hydrogen and lower alkyl, R' is a member selected from the group consisting of hydrogen, alkanoyl having from two to seven carbon atoms, trifluoroacetyl, benzoyl, p-chlorobenzoyl, o-methoxybenzoyl, p-toluoyl, p-anisoyl and nicotinoyl, and R" is a member selected from the group consisting of N,N-diethylamino, N,N-diisopropylamino, N-ethyl-N-isopropylamino, N-(lower alkyl)-N-phenylamino and N-(lower alkyl)-N-(p-tolyl)amino. The Patterson system of nomenclature is the system employed throughout this specification as is illustrated above by the foregoing general structural formula for a 2-hydroxy-(acyloxy)-3-(N,N-disubstituted carboxamido) - 10 - amino-1,2,3,4,6,7-hexahydro-11b-H-benzopyridocoline [e.g., see A. M. Patterson et al., The Ring Index, Reinhold Publishing Corp., New York (1940)].

Typical member compounds of this series include such benzopyridocolines as 2-hydroxy-3-(N,N-diethylcarboxamido) - 10 - amino-1,2,3,4,6,7-hexahydro-11b-H-benzopyridocoline (OH-axial), 2-acetoxy - 3 - (N,N-diethylcarboxamido)-10-amino-1,2,3,4,6,7-hexahydro-11b-H-benzopyridocoline ($CH_3COO$-axial), 2-trifluoroacetoxy-3-(N,N-diethylcarboxamido) - 10 - amino-1,2,3,4,6,7-hexahydro-11b-H-benzopyridocoline ($CF_3COO$-axial), 2-benzoyloxy-3 - (N,N-diethylcarboxamido)-10-amino-1,2,3,4,6,7-hexahydro-11b-H-benzopyridocoline ($C_6H_5COO$-axial), 2-hydroxy - 3 - (N,N-diethylcarboxamido) - 10 - methylamino-1,2,3,4,6,7 - hexahydro - 11b-H-benzopyridocoline (OH-axial), 2-acetoxy-3-(N,N-diethylcarboxamido)-10-dimethylamino - 1,2,3,4,6,7-hexahydro-11b-H-benzopyridocoline ($CH_3COO$-axial), and the like. These compounds are all of medicinal value in view of the potent tranquilizing effects which they exhibit, as are the corresponding axial-equatorial mixtures from which they are derived. The corresponding equatorial isomers, on the other hand, only possess these properties to a much lesser extent than do their aforementioned epimers, but they are useful as intermediates for the preparation of the axial-equatorial mixtures via standard equilibration techniques well-known to those having skill in the art to which this type subject matter pertains (e.g., via the use of aluminum isopropoxide in an acetone solvent medium). Moreover, as is already obvious from what has just been discussed, the axial-equatorial mixtures are also additionally useful as intermediates for the prepartion of the desired epimers of this series, viz., the axial compounds themselves.

The process employed for preparing these compounds involves reacting a 7-nitro-3,4-dihydroisoquinoline acid addition salt with the appropriate N,N-disubstituted acetoacetamide compound in the presence of formaldehyde to form the desired 2-oxo-3-(N,N-disubstituted carboxamido) - 10 - nitro-1,2,3,4,6,7-hexahydro-11b-H-benzopyridocoline. This particular method of synthesis is described in detail in my copending application Serial No. 136,186, filed September 6, 1961, and now U.S. Patent No. 3,095,419. Catalytic reduction of the aforementioned intermediate in accordance with standard organic procedure than affords the corresponding 2-hydroxy-10-aminobenzopyridocoline, which can be isolated in the form of a diacid addition salt or converted to the corresponding N-monoalkylated or N,N-dialkylated derivatives in accordance with conventional organic procedures. The aforementioned ester derivatives are, of course, in turn prepared from the latter type alcohols by conventional synthetic routes provided that care is first taken to block the free amino group.

In accordance with a more detailed consideration of the ring-closure step, a 7-nitro-3,4-dihydroisoquinoline acid addition salt, such as the hydrohalide salt or the nitrate, sulfate or phosphate, is contacted with formaldehyde and a N,N-disubstituted acetoacetamide where the substituted group is preferably lower alkyl, but may also be mixed alkyl-aryl groups such as N-(lower alkyl)-N-aryl, etc. A convenient source of formaldehyde such as paraformaldehyde may be used. In general, the process is carried out in a reaction-inert polar organic solvent at a temperature that is in the range of from about 20° C. up to about 100° C. for a period of about one to twenty-four hours. Preferred reaction-inert organic solvents in this connection include such water-miscible lower alkanols as methanol, ethanol, isopropanol, and the like, as well as such N,N-dialkyl lower alkane hydrocarbon carboxamides as N,N-dimethylformamide, N,N-diethylformadide, N,N-dimethylacetamide, etc. The amount of each reagent employed in this reaction will vary to some extent depending on their relative ease of synthesis and/or availability, but it is usually advisable to employ at least an equimolar amount of both the N,N-disubstituted acetoacetamide and the formaldehyde reagent with respect to the 3,4-dihydroisoquinoline starting material since the reaction proceeds on a 1:1:1 molar basis. A preferred reactant ratio in this connection has been found to be 1.5 molar equivalents each of the amide and formaldehyde reagents per one equivalent of the 3,4-dihydroisoquinoline compound. Incidentally, the formaldehyde reagent employed may be the 37% aqueous formaldehyde of commerce (which is preferred), more commonly known as formalin, or it may be generated into the reaction mixture in situ by depolymerizing the readily available paraformaldehyde with concentrated hydrochloric acid as previously indicated.

The conversion of the 2-oxo-10-nitrobenzopyridocolines to the corresponding 2-hydroxy-10-amino compounds is preferably accomplished via the use of catalytic hydrogenation with Adams' platinum oxide catalyst in a lower alkanolic solvent medium. The separation of the reduction product so obtained in each case into its respective OH-axial and OH-equatorial isomers is then readily effected by the use of column chromatography on neutral alumina, followed by elution with a suitable choice of solvents. In this connection, non-polar organic solvents like benzene, toluene and xylene usually serve to completely remove the OH-axial isomer from its epimer (the OH-equatorial form), which, in turn, is best removed from the column by the use of more polar type solvent systems such as the chlorinated lower hydrocarbons and mixtures of these lower alkanols (e.g., chloroform and chloroform-methanol).

Conversion of the 2-hydroxy-10-aminobenzopyridocolines prepared as described above to the corresponding N-monoalkyl compounds is, as previously indicated, readily effected by any number of standard procedures [see, for example, P. Rayet and M. Prost in Helvetica Chimica Acta, vol. 39, p. 87 (1956)] and preferably by the method which involves condensing an N-unsubstituted aminobenzopyridocoline of the aforementioned type with the appropriate lower alkane hydrocarbon carboxaldehyde or ketone, as the case may be, followed by or accompanied by reduction of the resultant Schiff base using either platinum, palladium or Raney nickel as the hydrogenation catalyst. The N,N-dialkyl derivatives are easily obtained in the same manner by merely reacting the amine with an excess of the aforementioned aldehyde reagent in the first step of the reaction, i.e., with at least a one molar excess of said aldehyde or two moles of aldehyde with repsect to one mole of the amine. In either case, the overall synthesis is conducted at a temperature that is in the range of from about 20° C. up to about 100° C. at a hydrogen gas pressure ranging from about one to fifty atmospheres (1–50 atm.), with the higher temperatures and pressures actually being preferred in the case of those compounds which as final products will possess more than one carbon atom in their lower N-monoalkyl moiety (more than two in the case of a N,N-dialkyl moiety) and/or have a branched chain in the alkyl group of said moiety.

The process used for the preparation of the ester derivatives of these compounds will vary, depending on whether an acid anhydride or an acyl halide is the reagent of choice to be employed. For instance, it is possible to prepare the herein described esters of the instant 2-hydroxy-10-aminobenzopyridocolines in high yield by contacting a 2-hydroxy-10-aminobenzopyridocoline diacid addition salt, such as the dihydrochloride, under substantially anhydrous conditions with an acylating agent selected from the group consisting of an alkane hydrocarbon carboxylic acid anhydride having from two to seven carbon atoms, trifluoroacetic anhydride, benzoic anhydride, p-chlorobenzoic anhydride, o-methoxybenzoic anhydride, p-toluic anhydride, p-anisoic anhydride and nicotinic anhydride in the presence of a lower alkane hydrocarbon carboxylic acid such as glacial acetic acid (although this is not absolutely necessary) at a temperature that is in the range of from about 20° C. up to about the boiling point of the reaction mixture (which may be as high as 140° C. in some instances) for a period of about one to about thirty hours. The amount of acylating agent employed is such that its molar ratio to the 2-hydroxy-10-aminobenzopyridocoline starting material is substantially equivalent to a value that is in the range of from about 1:1 up to about 5:1. Although it is quite possible, and even in some instances desirable, to carry out the reaction in the absence of a reaction-inert organic solvent, there may be times when the use of such a solvent is indicated, e.g., when the acylating agent employed is a solid compound. Suitable solvents in this connection include almost any neutral, inert anhydrous organic solvent, such as acetone, methyl ether ketone, methyl isobutyl ketone, benzene, toluene, xylene, 1,4-dioxane, tetrahydrofuran, methylene chloride, chloroform, ethylene dichloride, tetrachlorethane, methyl acetate, ethyl acetate, isopropyl acetate, methyl propionate, ethyl propionate, diethyl ether, diisopropyl ether, di-n-propyl ether, and the like, although it is preferred to use lower alkane hydrocarbon carboxylic acids like glacial acetic acid, propionic acid, isobutyric acid, and so on, for optimum results, as has been previously indicated. However, as previously indicated, the reaction can be conducted in the absence of such a solvent by merely employing an excess of the acylating agent if the latter compound happens to be a liquid.

Alternatively, it is also possible to prepare the aforementioned 2-acyloxy compounds by treating the appropriate 2-hydroxy-10-aminobenzopyridocoline diacid addition salt with an acyl chloride as the acylating agent of choice instead of the corresponding acid anhydride. This reaction is generally conducted in a neutral, inert organic solvent under anhydrous conditions at a temperature that is in the range of from about 0° C. up to about 100° C. for a period of about one-half to about eight hours, although it is usually most convenient and economical in practice to carry out the reaction at room temperature. Although any inert organic solvent may be employed as a suitable medium in which to carry out this acylation reaction, it is generally most desirable to employ such solvents as aromatic hydrocarbons, halogenated lower hydrocarbons, lower alkyl ketones, lower alkyl esters of lower alkane hydrocarbon carboxylic acids, lower dialkyl ethers, dioxane and tetrahydrofuran. Preferred aromatic hydrocarbons in this connection include benzene, toluene and xylene; preferred halogenated lower hydrocarbons include methylene chloride, chloroform, ethylene dichloride and s-tetrachlorethane; preferred lower alkyl ketones include acetone, methyl ethyl ketone and methyl isobutyl ketone; preferred lower alkyl esters of lower alkane hydrocarbon carboxylic acids include methyl acetate, ethyl acetate, isopropyl acetate, methyl propionate, ethyl propionate, and so on; while preferred lower dialkyl ethers include diethyl ether, diisopropyl ether, di-n-butyl ether, and the like.

In view of the fact that the compounds of this invention are basic in nature, they will form water-soluble salts with the appropriate acids during their isolation and/or subsequent purification steps as outlined in the examples to follow, as well as in preparing aqueous solutions of them for oral or parenteral administration. In practice, it is preferable to employ a strong acid for such purposes in view of the weakly basic nature of the compound which is to be reacted. Although such salts must be pharmaceutically acceptable since the final products are intended for human consumption, it is possible to isolate the desired 10-aminobenzopyridocoline from the reaction mixture in the form of a pharmaceutically unacceptable salt and subsequently convert the latter salt to the free organic compound by treatment with a base; the 10-aminobenzopyridocoline so obtained is then converted to a pharmaceutically acceptable acid addition salt thereof in the manner hereinafter indicated.

For instance, the acid addition salts of the 10-aminobenzopyridocoline of this invention can be prepared by treating free base with a substantially dimolar amount of the chosen acid in an aqueous solution or in a suitable organic solvent such as methanol or ethanol. Upon careful evaporation of the solvent, the solid salt is obtained. Alternatively, other recovery techniques are also applicable, such as freeze-drying when the solvent is water or the use of an anti-solvent in the case of an organic solution, e.g., the addition of diethyl ether to an ethanolic solution of the product will cause precipitation of the desired product to occur.

The acids which are used to prepare the pharmaceutically acceptable diacid addition salts of this invention must, of course, be those which necessarily form non-toxic acid addition salts containing a pharmaceutically acceptable anion, such as the hydrochloride, hydrobromide, hydriodide, nitrate, sulfate or bisulfate, phosphate or acid phosphate, acetate, lactate, citrate or acid citrate, tartrate or bitartrate, oxalate, succinate, maleate, gluconate, saccharate, methanesulfonate, ethanesulfonate, benzenesulfonate and p-toluenesulfonate salts, etc.

As previously indicated, the compounds of the present invention and particularly the axial isomers thereof are of primary value to therapy as tranquilizing agents, in addition to being useful as sedatives and as hypotensive agents as well. Furthermore, the toxicity of these particular 10-aminobenzopyridocoline amides has been found to be quite low when they are administered to mice in amounts that are sufficient to achieve the desired effects as hereinafter indicated. Moreover, no other harmful pharmacological side effects have been observed to occur as a result of their administration.

In accordance with a method of treatment of the present invention, the herein described tranquilizers can be administered to an agitated subject via the oral or parenteral routes. In general, these compounds are most desirably administered in doses ranging from about 20 mg. up to about 200 mg. per day, although variations will necessarily occur depending upon the weight of the subject being treated and the particular route of administration chosen. However, a dosage level that is in the range of from about 0.28 mg. to about 2.8 mg. per kg. of body weight per day is most desirably employed in order to achieve effective results. Nevertheless, is to be appreciated that still other variations may also occur in this respect, depending upon the species of animal being treated and its individual response to said medicament, as well as on the particular type of pharmaceutical formulation chosen and the time period and interval at which such administration is carried out. In some instances, dosage levels below the lower limit of the aforesaid range may be more than adequate, while in other cases still larger dosages may be employed without causing any harmful or deleterious side effects to occur provided that such higher dose levels are first divided into several smaller doses that are to be administered throughout the day.

In connection with the use of the 10-aminobenzopyridocoline amide compounds of this invention for the treatment of agitated subjects, it is to be noted that they may be administered either alone or in combination with pharmaceutically acceptable carriers by either of the routes previously indicated, and that such administration can be carried out in both single and multiple dosages. More particularly, the novel compounds of this invention can be administered in a wide variety of different dosage forms, i.e., they may be combined with various pharmaceutically acceptable inert carriers in the form of tablets, capsules, lozenges, troches, hard candies, powders, sprays, aqueous suspensions, injectable solutions, elixirs, syrups, and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for just such a purpose. In general, the therapeutically-effective compounds of this invention are present in such dosage forms at concentration levels ranging from about 0.5% to about 90% by weight of the total composition, i.e., in amounts which are sufficient to provide the desired unit dosage previously indicated.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft elastic and hard-filled gelatin capsules; preferred materials in this connection also include lactose or milk sugar as well as high molecular weight polyethylene glycols. When aqueous suspensions and/or elixirs are desired for oral administration, the essential active ingredient may be combined with various sweetening or flavoring agents, coloring matter or dyes and, if so desired, emulsifying and/or suspending agents, together with such diluents as water, ethanol, propylene glycol, glycerin and various like combinations thereof.

For purposes of parenteral administration, solutions of these particular 10-aminobenzopyridocoline amide bases in sesame or peanut oil or in aqueous-propylene glycol may be employed, as well as sterile aqueous solutions of the corresponding water-soluble acid addition salts previously enumerated. Such aqueous solutions should be suitably buffered if necessary and the liquid diluent rendered isotonic with sufficient saline or glucose. These particular aqueous solutions are especially suitable for intravenous, intramuscular and subcutaneous injection purposes. In this connection, the sterile aqueous media employed are readily obtained by standard techniques well-known to those skilled in the art. For instance, distilled water is ordinarily used as the liquid diluent and the final preparation is passed through a suitable bacterial filter, such as a sintered-glass filter or a diatomaceous-earth or unglazed porcelain filter. Preferred filters of this type include the Berkefeld, the Chamberland and the asbestos disc-metal Seitz filter, wherein the fluid is sucked through the filter candle into a sterile container with the aid of a suction pump. Needless to say, the necessary steps should be taken throughout the preparation of these injectable solutions to ensure that the final products are obtained in a sterile condition.

This invention is further illustrated by the following examples, which are not to be construed in any way as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

To 22 g. of diethylamine cooled in an ice bath there was slowly added with stirring 21.8 g. of diketene. After the addition was complete, the reaction mixture was heated on the steam bath for 30 minutes and then fractionally distilled under reduced pressure. In this manner, there was obtained a 92% yield of N,N-diethylacetoacetamide in the form of a pale yellow oil boiling at 109–112° C./4.5 mm. Hg.

*Anal.*—Calcd. for $C_8H_{15}NO_3$: C, 61.15; H, 9.55; N, 8.92. Found: C, 60.82; H, 9.77; N, 9.28.

*Example II*

The procedure described in Example I is followed except that N-ethyl-N-isopropylamine is used in place of diethylamine on an equimolar basis and the product obtained is N-ethyl-N-isopropylacetoacetamide, B.P. 109–110° C./4.0 mm. Hg.

*Anal.*—Calcd. for $C_9H_{17}NO_2$: C, 63.13; H, 10.00. Found: C, 62.78; H, 10.15.

*Example III*

The procedure described in Example I is followed except that diisopropylamine is employed in place of diethylamine on an equimolar basis and the product obtained is N,N-diisopropylacetoacetamide, B.P. 104–107° C./5.0 mm. Hg.

*Anal.*—Calcd. for $C_{10}H_{19}NO_2$: C, 64.53; H, 10.34; N, 7.56. Found: C, 64.53; H, 10.88; N, 7.82.

*Example IV*

In a 1000 ml. three-necked, round-bottomed flask equipped with dropping funnel, reflux condenser and mechanical stirrer were placed 30.3 g. (0.1 mole) of 7-nitro-3,4-dihydroisoquinoline hydrochloride, 31.8 g. (0.2 mole) of N,N-diethylacetoacetamide and 18 g. (0.2 mole) of paraformaldehyde dissolved in 500 ml. of isopropyl alcohol. Stirring was then commenced, while 25 ml. of concentrated hydrochloric acid was slowly run into the mixture. The dropping funnel was then replaced by a gas inlet tube and the resultant well-stirred reaction mixture was refluxed for 2.5 hours under a nitrogen atmosphere. Upon completion of this step, the hydrochloric acid addition salt of 2-oxo-3-(N,N-diethylcarboxamido)-10-nitro- 1,2,3,4,6,7-hexahydro - 11b - H-benzopyridocoline slowly crystallized from solution as the latter was cooled to room temperature. It was subsequently collected by means of suction filtration on a filter funnel to afford the pure hydrochloride. An aqueous solution of the latter salt was then extracted with benzene and the resultant aqueous layer made basic with sodium carbonate. Benzene extraction of the basic aqueous layer and subsequent evaporation of the resulting benzene extracts under reduced pressure gave a 63% yield of 2-oxo-3-(N,N-diethylcarboxamido)-10-nitro - 1,2,3,4,6,7 - hexahydro-11b-H-benzopyridocoline, M.P. 159–160.5° C.

*Anal.*—Calcd. for $C_{18}H_{23}N_3O_4$: C, 62.56; H, 6.71; N, 12.17. Found: C, 62.44; H, 6.51; N, 12.32.

The 7-nitro-3,4-dihydroisoquinoline starting material referred to above was prepared by the method of Mc-Coubry as described in the Journal of the Chemical Society (London), p. 2851 (1951).

*Example V*

2-oxo-3 - (N,N-diethylcarboxamido) - 10-nitro-1,2,3,4,6,7-hexahydro-11b-H-benzopyridocoline (7.4 g.) was dissolved in 250 ml. of hot ethanol and the resulting solution is allowed to cool at room temperature. After removal of all the dissolved oxygen therein by saturation of the solution with dry nitrogen gas, 740 mg. of Adams' platinum oxide catalyst was introduced into the system in one portion while still maintaining same under a nitrogen atmosphere. The reaction flask and its contents were then shaken at room temperature under slightly greater than one atmosphere of hydrogen pressure until the total hydrogen uptake was completed. Dissolved hydrogen gas was then removed from the reaction solution by saturation of same with dry nitrogen gas, while the platinum black was removed by means of gravity filtration. Concentration of the resulting filtrate under reduced pressure on a steam bath then afforded a nearly quantitative yield of 2-hydroxy-3-(N,N-diethylcarboxamido)-10-amino-1,2,3,4,6,7-hexahydro-11b-H-benzopyridocoline as a yellow crystalline solid (mixture of the axial and equatorial forms).

*Example VI*

A chromatographic column was prepared by packing 30 grams of neutral alumina, activity grade No. 3, in benzene as the mobile phase, into a column of standard dimensions to give a bed of adsorbent material one inch in diameter and four inches in height. A solution consisting of the entire product obtained in Example V dissolved in 50 ml. of benzene was then applied to the column, which was subsequently eluted with a benzene-chloroform (1:1 by volume) solvent system to remove the axial isomer and then with a 2% methanol-chloroform solvent system to remove the equatorial isomer. In either case, the eluate solutions were concentrated under reduced pressure and the residue so obtained in each instance was separately dissolved in absolute alcohol and treated with dry hydrogen chloride gas to give the respective hydrochloride salts. In this way, there was obtained a 1.7 g. yield of 2-hydroxy-3-(N,N-diethylcarboxamido)-10-amino-1,2,3,4,6,7-hexahydro - 11b - H-benzopyridocoline (OH-axial) dihydrochloride, M.P. 234–243° C. (*Anal.*—Calcd. for $C_{18}H_{29}Cl_2N_3O_2 \cdot \frac{1}{2}C_2H_5OH$: C, 55.20; H, 7.80; N, 10.16; Cl, 17.15. Found: C, 55.04; H, 7.66; N, 10.17; Cl, 17.20) and a 1.5 g. yield of 2-hydroxy-3-(N,N-diethylcarboxamido) - 10 - amino-1,2,3,4,6,7-hexahydro-11b-H-benzopyridocoline (OH-equatorial) dihydrochloride, M.P. 242–248° C. (*Anal.*—Calcd. for $C_{18}H_{29}Cl_2N_3O_2$: C. 55.38; H, 7.44; N, 10.77. Found: C, 55.11; H, 7.29; N, 10.49).

*Example VII*

The procedure described in Example V is repeated, employing other 2-oxo-3-(N,N-disubstituted carboxamido)-10-nitro - 1,2,3,4,6,7 - hexahydro-11b-H-benzopyridocolines as starting materials in place of the previously used 2-oxo-3-(N,N-diethylcarboxamido) - 10 - nitro-1,2,3,4,6,7-hexahydro-11b-H-benzopyridocoline. In order to avoid an unnecessary repetition of experimental detail, these starting materials are listed below as follows:

2-oxo-3-(N,N-dimethylcarboxamido)-10-nitro-1,2,3,4,6,7-hexahydro-11b-H-benzopyridocoline
2-oxo-3-(N,N-di-n-butylcarboxamido)-10-nitro-1,2,3,4,6,7-hexahydro-11b-H-benzopyridocoline
2-oxo-3-(N-methyl-N-phenylcarboxamido)-10-nitro-1,2,3,4,6,7-hexahydro-11b-H-benzopyridocoline
2-oxo-3-(N-ethyl-N-phenylcarboxamido)-10-nitro-1,2,3,4,6,7-hexahydro-11b-H-benzopyridocoline
2-oxo-3-[N-ethyl-N-(p-tolyl)carboxamido]-10-nitro-1,2,3,4,6,7-hexahydro-11b-H-benzopyridocoline
2-oxo-3-(N,N-di-n-propylcarboxamido)-10-nitro-1,2,3,4,6,7-hexahydro-11b-H-benzopyridocoline
2-oxo-3-(N,N-diisopropylcarboxamido)-10-nitro-1,2,3,4,6,7-hexahydro-11b-H-benzopyridocoline
2-oxo-3-(N-ethyl-N-isopropylcarboxamido)-10-nitro-1,2,3,4,6,7-hexahydro-11b-H-benzopyridocoline In each and every case, the corresponding 2-hydroxy-10-aminobenzopyridocoline compounds are obtained in the form of an epimeric mixture of their axial and equatorial isomers. The epimers may be separated as in Example VI.

*Example VIII*

A mixture consisting of 2.19 g. (0.010 mole) of 2-hydroxy-3-(N,N-diethylcarboxamido) - 10 - amino-1,2,3,4,6,7-hexahydro-11b-H-benzopyridocoline (OH-axial), 1.05 g. (0.013 mole) of 37% aqueous formaldehyde (formalin), 200 mg. of anhydrous sodium acetate, 20 ml. of ethanol and 300 mg. of Raney nickel is hydrogenated at room temperature (25° C.) under a pressure of 2 atmospheres of hydrogen. After one mole of hydrogen has been absorbed, the reaction is terminated and the nickel catalyst removed from the mixture by means of filtration. The resulting filtrate is then made basic to litmus with 10% aqueous sodium hydroxide solution and extracted with several portions of benzene. The combined benzene extracts are then washed with water, dried over anhydrous sodium sulfate and subsequently evaporated to dryness in vacuo to afford a crude residual material. Upon treatment of the latter substance with a concentrated ethanolic solution of ethereal hydrogen chloride, the dihydrochloride acid addition salt of 2-hydroxy-3-(N,N-diethylcarboxamido)-10 - (N-monoethylamino) - 1,2,3,4,6,7-hexahydro-11b-H-benzopyridocoline (OH-axial) soon crystallizes from the resultant solution. Recrystallization from isopropanol affords the pure product.

In like manner, the use of an equivalent amount in moles of acetaldehyde in place of the formaldehyde used above in this one-step reaction affords 2-hydroxy-3-(N,N-diethylcarboxamido) - 10 - (N-monoethylamino)-1,2,3,4,6,7-hexahydro-11b-H-benzopyridocoline (OH-axial) dihydrochloride; while when propionaldehyde is the reagent of choice employed in this procedure and is used on the same molar basis as formaldehyde, the corresponding product obtained is 2-hydroxy-3-(N,N-diethylcarboxamido)-10-[N-mono(n-propyl)amino] - 1,2,3,4,6,7-hexahydro-11b-H-benzopyridocoline (OH-axial) dihydrochloride. On the other hand, the use of an equivalent amount in moles of acetone in place of the formaldehyde reagent previously mentioned, as well as a reaction temperature of 50° C. and a hydrogen pressure of 10 atmospheres, affords 2-hydroxy-3-(N,N - diethylcarboxamido)-10-(N-monoisopropylamino)-1,2,3,4,6,7 - hexahydro-11b-H-benzopyridocoline (OH-axial) dihydrochloride as the product which is obtained.

*Example IX*

A mixture consisting of 2.19 g. (0.010 mole) of 2-hydroxy-3-(N,N-diethylcarboxamido) - 10 - amino-1,2,3,4,6,7-hexahydro - 11b - H - benzopyridocoline (OH-axial), 2.44 g. of 37% aqueous formaldehyde, 1 ml. of glacial acetic acid, 20 ml. of ethanol and 50 mg. of platinum oxide is hydrogenated at room temperature (25° C.) and at 3 atmospheres of hydrogen pressure. After one mole of hydrogen has been absorbed, the reaction is terminated and the desired product isolated from said mixture in the same manner as described in the previous example for the 10-monomethylamino compound. In this way, the dihydrochloride acid addition salt of 2-hydroxy-3-(N,N - dimethylcarboxamido)-10-(N,N-dimethylamino)-1,2,3,4,6,7 - hexahydro-11b-H-benzopyridocoline (OH-axial) is obtained.

In like manner, the use of an equivalent amount in moles of acetaldehyde in the place of the formaldehyde used above in this reaction affords 2-hydroxy-3-(N,N-diethylcarboxamido)-10-(N,N - diethylamino) - 1,2,3,4,6,7-hexahydro-11b-H-benzopyridocoline (OH-axial) dihydrochloride; while when propionaldehyde is the reagent of choice employed in this procedure and is used on the same molar basis as formaldehyde, the corresponding product obtained is 2-hydroxy-3-(N,N-diethylcarboxamido) - 10 - [N,N-di(n-propyl)amino]-1,2,3,4,6,7-hexahydro-11b - H - benzopyridocoline (OH-axial) dihydrochloride. On the other hand, the use of an equivalent amount in moles of acetone in place of the formaldehyde reagent previously mentioned, as well as a reaction temperature of 50° C. and a hydrogen pressure of 10 atmospheres, affords 2-hydroxy-3-(N,N-diethylcarboxamido)-10-(N,N-diisopropylamino) - 1,2,3,4,6,7 - hexahydro-11b-H-benzopyridocoline (OH-axial) dihydrochloride as the product which is obtained.

*Example X*

The procedures described in the preceding two examples are repeated employing other 2-hydroxy-3-(N,N-disubstituted carboxamido)-10-amino - 1,2,3,4,6,7-hexahydro-11b-H-benzopyridocolines as starting materials in place of 2-hydroxy - 3 - (N,N-diethylcarboxamido)-10-amino - 1,2,3,4,6,7 - hexahydro-11b-H-benzopyridocoline (OH-axial). Thus, when the 2-hydroxy-10-aminobenzopyridocolines prepared in Example VII are subjected to the procedure described in Example VIII, the following products are obtained:

2-hydroxy-3-(N,N-dimethylcarboxamido)-10-[N-mono-(n-propyl)amino]-1,2,3,4,6,7-hexahydro-11b-H-benzopyridocoline dihydrochloride
2-hydroxy-3-(N,N-di-n-butylcarboxamido)-10-(N-monomethylamino)-1,2,3,4,6,7-hexahydro-11b-H-benzopyridocoline dihydrochloride
2-hydroxy-3-(N-methyl-N-phenylcarboxamido)-10-(N-monoethylamino)-1,2,3,4,6,7-hexahydro-11b-H-benzopyridocoline dihydrochloride
2-hydroxy-3-(N-ethyl-N-phenylcarboxamido)-10-(N-isopropylamino)-1,2,3,4,6,7-hexahydro-11b-H-benzopyridocoline dihydrochloride
2-hydroxy-3-[N-ethyl-N-(p-tolyl)-carboxamido]-10-[N-mono(n-propyl)amino]-1,2,3,4,6,7-hexahydro-11b-H-benzopyridocoline dihydrochloride
2-hydroxy-3-(N,N-di-n-propylcarboxamido)-10-(N-monoethylamino)-1,2,3,4,6,7-hexahydro-11b-H-benzopyridocoline dihydrochloride
2-hydroxy-3-(N,N-diisopropylcarboxamido)-10-(N-monomethylamino)-1,2,3,4,6,7-hexahydro-11b-H-benzopyridocoline dihydrochloride
2-hydroxy-3-(N-ethyl-N-isopropylcarboxamido)-10-[N-mono(n-propyl)amino]-1,2,3,4,6,7-hexahydro-11b-H-benzopyridocoline dihydrochloride In like manner, when the compounds prepared in Example VII are subjected to the procedure described in Example IX, the following products are obtained:

2-hydroxy-3-(N,N-dimethylcarboxamido)-10-[N,N-di(n-propyl)amino]-1,2,3,4,6,7-hexahydro-11b-H-benzopyridocoline dihydrochloride
2-hydroxy-3-(N,N-di-n-butylcarboxamido)-10-(N,N-dimethylamino)-1,2,3,4,6,7-hexahydro-11b-H-benzopyridocoline dihydrochloride
2-hydroxy-3-(N-methyl-N-phenylcarboxamido)-10-(N,N-diethylamino)-1,2,3,4,6,7-hexahydro-11b-H-benzopyridocoline dihydrochloride
2-hydroxy-3-(N-ethyl-N-phenylcarboxamido)-10-(N,N-diisopropylamino)-1,2,3,4,6,7-hexahydro-11b-H-benzopyridocoline dihydrochloride
2-hydroxy-3-[N-ethyl-N-(p-tolyl)carboxamido]-10-[N,N-di(n-propyl)amino]-1,2,3,4,6,7-hexahydro-11b-H-benzopyridocoline dihydrochloride
2-hydroxy-3-(N,N-di-n-propylcarboxamido)-10-(N,N-diethylamino)-1,2,3,4,6,7-hexahydro-11b-H-benzopyridocoline dihydrochloride
2-hydroxy-3-(N,N-diisopropylcarboxamido)-10-(N,N-dimethylamino)-1,2,3,4,6,7-hexahydro-11b-H-benzopyridocoline dihydrochloride
2-hydroxy-3-(N-ethyl-N-isopropylcarboxamido)-10-[N,N-di-(n-propyl)amino]-1,2,3,4,6,7-hexahydro-11b-H-benzopyridocoline dihydrochloride As indicated by the disclosure in Example VII, any of the above listed products in this example can be obtained in the form of their axial and equatorial isomers as well as in the form of an epimeric mixture of the same, depending upon which form of the corresponding starting material is employed in each case.

*Example XI*

A mixture consisting of two grams of 2-hydroxy-3-(N,N-diethylcarboxamido)-10-amino - 1,2,3,4,6,7 - hexahydro-11b-H-benzopyridocoline (OH-axial) dihydrochloride dissolved in 7 ml. of acetic anhydride and 18 ml. of glacial acetic acid is heated at 100° C. for three hours under a nitrogen atmosphere. At the end of this period, the reaction mixture was cooled to room temperature and subsequently diluted with an equal volume of diethyl ether and then filtered. The crystalline hydrochloride salt so obtained is then converted to the corresponding free base by distribution in 10 ml. of a benzene-aqueous 5% sodium carbonate system. The product recovered from the benzene extracts is then recrystallized from diisopropyl ether to afford pure 2-acetoxy-3-(N,N-diethylcarboxamido) - 10 - amino-1,2,3,4,6,7-hexahydro-11b-H-benzopyridocoline ($CH_3COO$-axial).

*Example XII*

The procedure described in Example XI is followed except that 4 ml. of propionic anhydride is made to react with 1 g. of 2-hydroxy-3-(N,N-diethylcarboxamido)-10-amino - 1,2,3,4,6,7 - hexahydro-11b-H-benzopyridocoline (OH-axial) dihydrochloride in the presence of 10 ml. of glacial acetic acid. Also, the heating step is carried out for a period of seven hours. In this way, there is obtained 2-propionoxy-3-(N,N-diethylcarboxamido) - 10 - amino-1,2,3,4,6,7 - hexahydro - 11b - H - benzopyridocoline ($C_2H_5COO$-axial).

*Example XIII*

The procedure described in Example XI is followed except that 10 ml. of isobutyric anhydride is made to react with the 2-hydroxy - 3 - (N,N-diethylcarboxamido)-1,2,3,4,6,7-hexahydro - 11b - H - benzopyridocoline (OH-axial) dihydrochloride starting material in the presence of 40 ml. of glacial acetic acid for a period of six hours. In this way, there is obtained 2-isobutyroxy - 3 - (N,N-diethylcarboxamido) - 10 - amino-1,2,3,4,6,7-hexahydro-11b-H-benzopyridocoline ($i$-$C_3H_7COO$-axial).

*Example XIV*

The procedure described in Example XI is followed except that 5 ml. of trifluoroacetic anhydride and 1 g. of 2-hydroxy-3-(N,N-diethylcarboxamido) - 10 - amino-1,2,3,4,6,7-hexahydro-11b-H - benzopyridocoline (OH-axial) dihydrochloride are refluxed together under a nitrogen atmosphere for a period of one hour only. The excess anhydride is then removed from the reaction mixture by means of evaporation under reduced pressure, and the residue so obtained is subsequently distributed between 10 ml. of a chloroform-aqueous 5% sodium bicarbonate system. Evaporation of the chloroform extract and crystallization of the resultant solid residue from ethyl acetate-hexane then affords 2-trifluoroacetoxy - 3 - (N,N-diethylcarboxamido) - 10-amino-1,2,3,4,6,7-hexahydro-11b-H-benzopyridocoline (CF₃COOH-axial).

*Example XV*

The procedure described in Example XI is repeated employing caproic anhydride as the reagent of choice in lieu of acetic anhydride. In this way, 2-caproyl-3-(N,N-diethylcarboxamido) - 10 - amino-1,2,3,4,6,7-hexahydro-11b-H-benzopyridocoline ($C_5H_{11}COO$-axial) is the product obtained. In like manner, the use of heptanoic anhydride as the acylating agent in this reaction affords the corresponding 2-heptanoate ($C_6H_{13}COO$-axial), while the use of nicotinic anhydride affords the corresponding 2-nicotinate ($C_5H_4NCOO$-axial).

*Example XVI*

A mixture consisting of 1 g. of 2-hydroxy-3-(N,N-diethylcarboxamido) - 10-amino-1,2,3,4,6,7-hexahydro-11b-H-benzopyridocoline (OH-axial) dihydrochloride and 1 ml. of benzoyl chloride is heated at 100° C. for two hours under a nitrogen atmosphere. The dark-colored reaction mixture is then poured into 50 ml. of water, made alkaline to litmus with 10 ml. of 5% sodium carbonate solution and extracted with benzene. The desired product is subsequently isolated from the benzene extracts by means of column chromatography, employing activated alumina (30 g.) as the chromatographic agent. Recrystallization of the isolated product from diisopropyl ether affords pure 2-benzoyl-3-(N,N - diethylcarboxamido)-10-amino-1,2,3,4,6,7 - hexahydro - 11b - H - benzopyridocoline ($C_6H_5COO$-axial).

*Example XVII*

The procedure described in the two previous examples is repeated employing other acyl chlorides in lieu of benzoyl chloride. Thus, when p-chlorobenzoyl chloride, o-methoxybenzoyl chloride, p-toluoyl chloride and p-anisoyl chloride are each individually employed as the reagent of the choice in this particular reaction, the corresponding 2-(ring-substituted benzoates) are respectively obtained (as the axial isomers).

*Example XVIII*

The procedure described in Example XI is repeated using other 2-hydroxy - 3 - (N,N-disubstituted carboxamido)-10-amino - 1,2,3,4,6,7 - hexahydro-11b-H-benzopyridocoline (OH-axial) starting materials (as prepared in Examples VII–X) in place of 2-hydroxy-3-(N,N-diethylcarboxamido)-10-amino - 1,2,3,4,6,7 - hexahydro-11b-H-benzopyridocoline (OH-axial). In order to avoid unnecessary repetition of experimental detail, these starting materials are listed below as follows:

2-hydroxy-3-(N,N-dimethylcarboxamido)-10-amino-1,2,3,4,6,7-hexahydro-11b-H-benzopyridocoline (AH-axial)

2-hydroxy-3-(N,N-di-n-butylcarboxamido)-10-amino-1,2,3,4,6,7-hexahydro-11b-H-benzopyridocoline (OH-axial)

2-hydroxy-3-(N,N-diethylcarboxamide)-10-(N-monomethylamino)-1,2,3,4,6,7-hexahydro-11b-H-benzopyridocoline (OH-axial)

2-hydroxy-3-(N-methyl-N-phenylcarboxamido)-10-amino-1,2,3,4,6,7-hexahydro-11b-H-benzopyridocoline (OH-axial)

2-hydroxy-3-(N-ethyl-N-phenylcarboxamido)-10-amino-1,2,3,4,6,7-hexahydro-11b-H-benzopyridocoline (OH-axial)

2-hydroxy-3-[N-ethyl-N-(p-tolyl)carboxamido]-10-amino-1,2,3,4,6,7-hexahydro-11b-H-benzopyridocoline (OH-axial)

2-hydroxy-3-(N,N-diethylcarboxamido)-10-[N-mono(n-propyl)amino]-1,2,3,4,6,7-hexahydro-11b-H-benzopyridocoline (OH-axial)

2-hydroxy-3-(N,N-di-n-propylcarboxamido)-10-amino-1,2,3,4,6,7-hexahydro-11b-H-benzopyridocoline (OH-axial)

2-hydroxy-3-(N,N-diisopropylcarboxamido)-10-amino-1,2,3,4,6,7-hexahydro-11b-H-benzopyridocoline (OH-axial)

2-hydroxy-3-(N,N-diethylcarboxamido)-10-(N,N-diethylamino)-1,2,3,4,6,7-hexahydro-11b-H-benzopyridocoline (OH-axial)

2-hydroxy-3-(N-ethyl-N-isopropylcarboxamido)-10-amino-1,2,3,4,6,7-hexahydro-11b-H-benzopyridocoline (OH-axial)

In each and every case, the corresponding 2-acetoxy-3-(N,N-disubstituted carboxamido) - 10-amino-1,2,3,4,6,7-hexahydro-11b - H - benzopyridocoline ($CH_3COO$-axial) compound is the product actually obtained. In like manner, the use of these same particular starting materials in any of the other procedures described in Examples XII–XVII also affords the corresponding derivative in the form of an axial isomer in each and every case.

*Example XIX*

The procedure described in Example XI is repeated except that the 2 - hydroxy - 10 - aminobenzopyridocoline starting material employed happens to be an epimeric mixture of the axial and equatorial forms rather than the pure axial isomer itself. Thus, when the product of Example V is subjected to the reaction procedure of Example XI there is obtained an epimeric mixture of the axial and equatorial forms of 2 - acetoxy - 3 - (N,N-diethylcarboxamido) - 10 - amino-1,2,3,4,6,7-hexahydro-11b-H-benzopyridocoline. In like manner, the use of this particular starting material in any of the other procedures described in Examples XII–XVII affords the corresponding derivative as an epimeric mixture of isomers in each case.

Similar results are also obtained when epimeric mixtures of the 2-hydroxy-10-aminobenzopyridocolines listed in Example XVIII are individually employed as starting materials in these reactions, i.e., the corresponding derivatives obtained are also epimeric mixtures of their respective axial and equatorial forms.

*Example XX*

The non-toxic hydrohalide diacid addition salts of each of the 10-aminobenzopyridocoline bases reported in the previous examples, such as the dihydrochloride, dihydrobromide and dihydriodide salts thereof other than those previously reported in Examples VIII–X, are prepared by first dissolving the respective 10-aminobenzopyridocoline amide base in absolute ether followed by introduction of the appropriate hydrogen halide gas into the solution until saturation is complete, whereupon the desired salt precipitates from solution. The crystalline product so obtained is then recrystallized from acetone-ether to yield the pure dihydrohalide salt. For instance, when 1.0 g. of 2-acetoxy-3-(N,N-diethylcarboxamido) - 10-amio-1,2,3,4,6,7-hexahydro-11b-H - benzopyridocoline ($CH_3COO$-axial) is dissolved in anhydrous diethyl ether and dry hydrogen chloride gas is passed into the resulting solution until two molar equivalents of said gas have been introduced, there is obtained a crystalline precipitate of 2-acetoxy-3-(N,N-diethylcarboxamido) - 10 - amino-1,2,3,4,6,7 - hexahydro-11b-H-benzopyridocoline ($CH_3COO$-axial) dihydrochloride.

*Example XXI*

The nitrate, sulfate or bisulfate, phosphate or acid phosphate, acetate, lactate, citrate or acid citrate, tartrate or bitartrate, oxalate, succinate, maleate, gluconate and saccharate salts of each of the benzopyridocoline bases reported in the previous examples are all prepared by separately dissolving in a suitable amount of ethanol the proper molar amounts of the respective acid and the appropriate 10-aminobenzopyridocoline base and then mixing the two solutions together, followed by the addition of diethyl ether to the resulting reaction mixture in order to effect precipitation of the desired diacid addition salt therefrom. For instance, when 2-acetoxy-3-(N,N-diethylcarboxamido)-10-amino - 1,2,3,4,6,7 - hexahydro-11b-H-benzopyridocoline ($CH_3COO$-axial) and a slight excess of concentrated sulfuric acid react in accordance with this procedure, the corresponding product obtained is the sulfate of 2-acetoxy-3-(N,N-diethylcarboxamido)-10-amino-1, 2, 3,4,6,7 - hexahydro - 11b - H - benzopyridocoline ($CH_3COO$-axial).

*Example XXII*

A dry solid pharmaceutical composition is prepared by blending the following materials together in the proportions by weight specified below:

2 - acetoxy - 3-(N,N - diethylcarboxamido)-10-amino-1,2,3,4,6,7 - hexahydro - 11b-H-benzopyridocoline ($CH_3COO$-axial) dihydrochloride _____ 10
Dicalcium phosphate _____ 45
Potato starch _____ 20
Lactose _____ 15
Polyvinylpyrrolidone _____ 8
Magnesium stearate _____ 2

After the dried composition is thoroughly blended, tablets are punched from the resulting mixture, each tablet being of such size that it contains 40 mg. of the active ingredient.

*Example XXIII*

A dry solid pharmaceutical composition is prepared by combining the following materials in the proportions by weight specified below:

2 - acetoxy - 3-(N,N-diethylcarboxamido)-10-amino-1,2,3,4,6,7 - hexahydro - 11b-H-benzopyridocoline ($CH_3COO$-axial) dihydrochloride _____ 30
Polyethylene glycol (average molecular weight, 6000) _____ 25
Lactose _____ 30
Calcium carbonate _____ 15

The dried solid mixture so prepared is then thoroughly agitated so as to obtain a powdered product that is completely uniform. Soft elastic and hard-filled gelatin capsules containing this pharmaceutical composition are then subsequently prepared, employing a sufficient quantity of material so as to provide each capsule with 100 mg. of the active ingredient.

*Example XXIV*

An aqueous propylene glycol solution containing 2-acetoxy - 3 - (N,N - diethylcarboxamido) - 10 - amino-1, 2, 3, 4, 6, 7 - hexahydro - 11b - H-benzopyridocoline ($CH_3COO$-axial) dihydrochloride is prepared by dissolving the latter compound in propylene glycol-water (1:3 by weight) with the aid of gently heating. The amount of compound employed is such that the resulting solution contains 5 mg. of the active ingredient per ml. of solution. After cooling to room temperature, it is sterilized by means of filtration through a Seitz filter. The sterile aqueous propylene glycol solution so obtained is suitable for intramuscular administration to animals.

*Example XXV*

The procedure described is Example XI is repeated except that the 2-hydroxy-10-aminobenzopyridocoline starting material employed happens to be the equatorial isomer rather than the axial isomer that was previously used. Thus, when 2-hydroxy-3-(N,N-diethylcarboxamido)-10-amino - 1,2,3,4,6,7 - hexahydro-11b-H-benzopyridocoline (OH-equatorial) is subjected to the reaction procedure of Example XI, the product obtained is 2-acetoxy-3-(N,N-diethylcarboxamido) - 10 - amino-1,2,3,4,6,7-hexahydro-11b-H-benzopyridocoline ($CH_3COO$-equatorial). In like manner, the use of this particular starting material in any of the other procedures described in Examples XII–XVII affords the corresponding derivative in the form of the equatorial isomer in each case.

Similar results are also obtained when the equatorial forms of the other 2-hydroxy-10-aminobenzopyridocolines listed in Example XVIII are each individually employed as starting materials in these reactions, i.e., the corresponding derivatives prepared in this manner are also obtained in the form of their respective equatorial isomers.

What is claimed is:

1. A compound selected from the group consisting of benzopyridocoline bases of the formula:

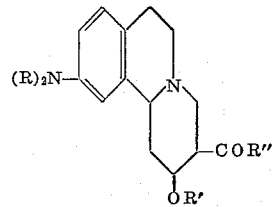

and the pharmaceutically acceptable acid addition salts thereof, wherein R is a member selected from the group consisting of hydrogen and lower alkyl, R' is a member selected from the group consisting of hydrogen, alkanoyl of from two to seven carbon atoms, trifluoroacetyl, benzoyl, p-chlorobenzoyl, o-methoxybenzoyl, p-toluoyl, p-anisoyl and nicotinoyl, and R'' is a member selected from the group consisting of N,N-diethylamino, N,N-diisopropylamino, N-ethyl-N-isopropylamino, N-(lower alkyl)-N-phenylamino and N-(lower alkyl)-N-(p-tolyl)amino.

2. An axial isomer of a compound of claim 1.

3. 2 - acyloxy-3-(N,N-diethylcarboxamido)-10-amino-1,2,3,4,6,7-hexahydro-11b-H-benzopyridocoline wherein the acyl moiety is alkanoyl having from two to seven carbon atoms.

4. 2 - acetoxy-3-(N,N-diethylcarboxamido)-10-amino-1,2,3,4,6,7-hexahydro-11b-H-benzopyridocoline wherein the acetoxy group is axial.

5. 2 - trifluoroacetoxy - 3-(N,N-diethylcarboxamido)-10-amino-1,2,3,4,6,7-hexahydro-11b-H-benzopyridocoline wherein the trifluoroacetoxy group is axial.

6. 2 - benzoyloxy - 3 - (N,N-diethylcarboxamido)-10-amino - 1,2,3,4,6,7-hexahydro-11b-H-benzopyridocoline wherein the benzoyloxy group is axial.

7. 2 - hydroxy-3-(N,N-diethylcarboxamido)-10-amino-1,2,3,4,6,7-hexahydro-11b-H-benzopyridocoline wherein the hydroxy group is axial.

8. 2-hydroxy-3-(N,N-diethylcarboxamido)-10-(N-monisopropylamino) - 1,2,3,4,6,7 - hexahydro-11b-H-benzopyridocoline wherein the hydroxy group is axial.

9. 2 - hydroxy-3-(N,N-diethylcarboxamido)-10-(N,N-diethylamino) - 1,2,3,4,6,7-hexahydro-11b-H-benzopyridocoline wherein the hydroxy group is axial.

10. An epimeric mixture of the axial and equatorial forms of a compound of claim 1.

References Cited in the file of this patent
UNITED STATES PATENTS
3,053,845    Tretter _____ Sept. 11, 1962